(12) United States Patent
Zhang

(10) Patent No.: US 7,827,444 B2
(45) Date of Patent: Nov. 2, 2010

(54) APPLICATION CRASH RESIST METHOD AND APPARATUS

(75) Inventor: Lifeng Levin Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 11/904,753

(22) Filed: Sep. 28, 2007

(65) Prior Publication Data

US 2009/0089621 A1   Apr. 2, 2009

(51) Int. Cl.
*G06F 11/00* (2006.01)

(52) U.S. Cl. .......................................... 714/38; 714/15

(58) Field of Classification Search ..................... 714/38
See application file for complete search history.

(56) References Cited

U.S. PATENT DOCUMENTS

| | | | | |
|---|---|---|---|---|
| 5,815,702 A | * | 9/1998 | Kannan et al. | 712/244 |
| 6,195,760 B1 | * | 2/2001 | Chung et al. | 714/4 |
| 6,308,243 B1 | * | 10/2001 | Kido | 711/147 |
| 6,434,628 B1 | * | 8/2002 | Bowman-Amuah | 714/48 |
| 6,457,138 B1 | * | 9/2002 | Lesser et al. | 714/1 |
| 6,857,085 B1 | * | 2/2005 | Ruhlen et al. | 714/38 |
| 7,089,455 B2 | * | 8/2006 | Ruhlen et al. | 714/38 |
| 7,249,211 B2 | * | 7/2007 | Wieland et al. | 710/269 |
| 2003/0018681 A1 | * | 1/2003 | Subramanian et al. | 709/102 |
| 2004/0221203 A1 | * | 11/2004 | Ruhlen et al. | 714/38 |
| 2007/0168743 A1 | * | 7/2007 | Ramamurthy et al. | 714/38 |

\* cited by examiner

*Primary Examiner*—Scott T Baderman
*Assistant Examiner*—Kamini Patel
(74) *Attorney, Agent, or Firm*—Schwabe, Williamson & Wyatt, P.C.

(57) ABSTRACT

Embodiments of an application crash resist method and apparatus including an abnormal application termination service and an exception handler are disclosed herein. The service is configured to broadcast messages to cause the exception handler to be loaded by applications, and the exception handler is configured to stall abnormal termination of an application having loaded an instance of the exception handler. In various embodiments, the exception handler instances further report abnormal terminations to the service, and to receive instructions on how long to stall from the service. In various embodiments, the method and apparatus further includes a tray application through which the service obtains user inputs on how long to stall an abnormal termination from a user.

15 Claims, 4 Drawing Sheets

APPLICATION CRASH RESIST METHOD AND APPARATUS

TECHNICAL FIELD

Embodiments of the present invention relate to the field of data processing, in particular, to methods and apparatuses for resisting application crashes.

BACKGROUND

Ever since the advance of computing, fail soft computing has been a desired goal. With the advance of personal computing, making available computing power that was once reserved for main frame computing to ever increasingly novice computing users, the goal has become even more important.

Most users have encountered application crashes: When application crashes, it often stops execution suddenly and disappears from the screen. In many cases, the user looses any data or work in process at the time an application crashes. Usually, a report dialog asking the user whether to report the application crash is the only thing that is left for a user after an application crashed.

For the purpose of this application, the phrase "application crash" is synonymous with "abnormal application termination", and these phrases and their variants are used interchangeably.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for resisting abnormal application terminations (also may be referred to as application crashes).

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
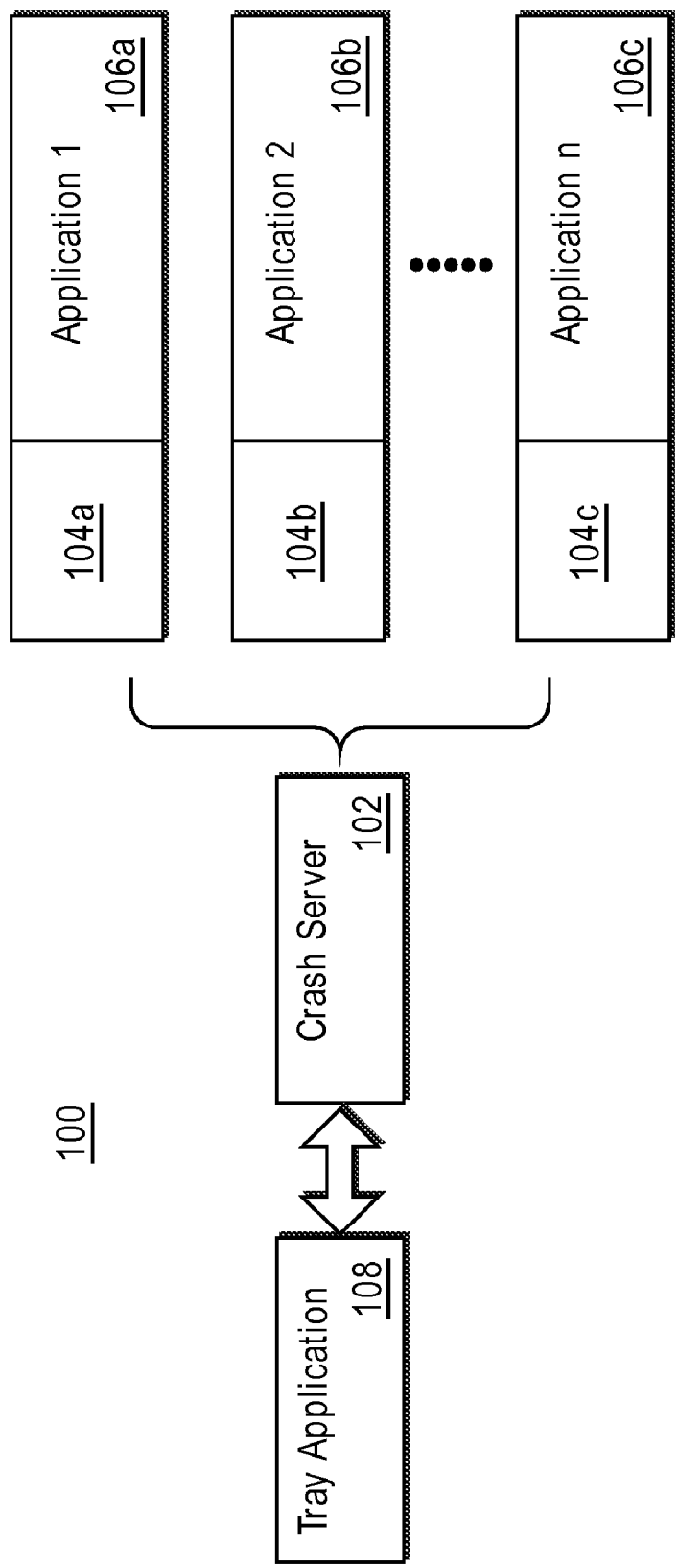
FIG. 1 illustrates an overview of an application execution environment, in accordance with various embodiments of the present invention.

FIG. 1 illustrates an overview of an application execution environment, in accordance with various embodiments of the present invention. As illustrated, application execution environment 100 includes a number of applications 106a-106c being executed by one or more processors (not shown) under the control of one or more operating systems (not shown). Applications 106a-106c represent a broad range of applications known in the art and to be designed, including but not limited to word processing applications, spreadsheet applications, presentation applications, media player applications and so forth.

Additionally, in accordance with teachings of the present inventions, applications 106a-106c are correspondingly loaded with exception handler instances 104a-104c of the present invention. Each exception handler instance 104a, 104b etc is dedicated to handling abnormal termination exceptions that arise during execution of the corresponding application 106a, 106b etc having loaded the particular exception handler instances.

Further, for the illustrated embodiments, the application execution environment is provided with crash server 102 and tray application 108. Crash server 102 may also be referred to as an abnormal application termination service. As will be described in more detail below, crash server 102 is configured to cause the exception handler instances 104a-104c to be correspondingly loaded by applications 106a-106c, and to cooperate with the exception handler instances 104a-104c to resist application crashes to provide a softer, more user friendly handling of application crashes, and in particular, to allow user inputs to the abnormal termination handling process, more specifically, through tray application 108.

According to some user research among Small and Medium Business (SMB) users, an application crash is one of highest concerns when they use personal computers. The research shows that this user base prefers to adopt low priced, not necessarily robustly designed software, therefore have much more application crash problems as compare to other user segments (e.g. large enterprise users). Moreover, these users usually do not have information technology (IT) support staff to assist them in handling application crashes (e.g. recovering data). Thus, an effective generic application crash intercepting and handling solution is highly desired and appreciated by this user base.

These various components, crasher server 102, exception handler 104*(* refers to any one of the instance subscripts, a, b, and so forth), and tray application 108, including the manner in which the components cooperate with each other, will be further described in more detail in turn below. It will be readily apparent that in alternate embodiments, the present invention may be practiced without some of the described operations, or with additional operations, and the operations/ functions may be organized in other component structures, e.g. having crasher server 102 directly interacting with a user, without the use of tray application 108.

Figure 2:
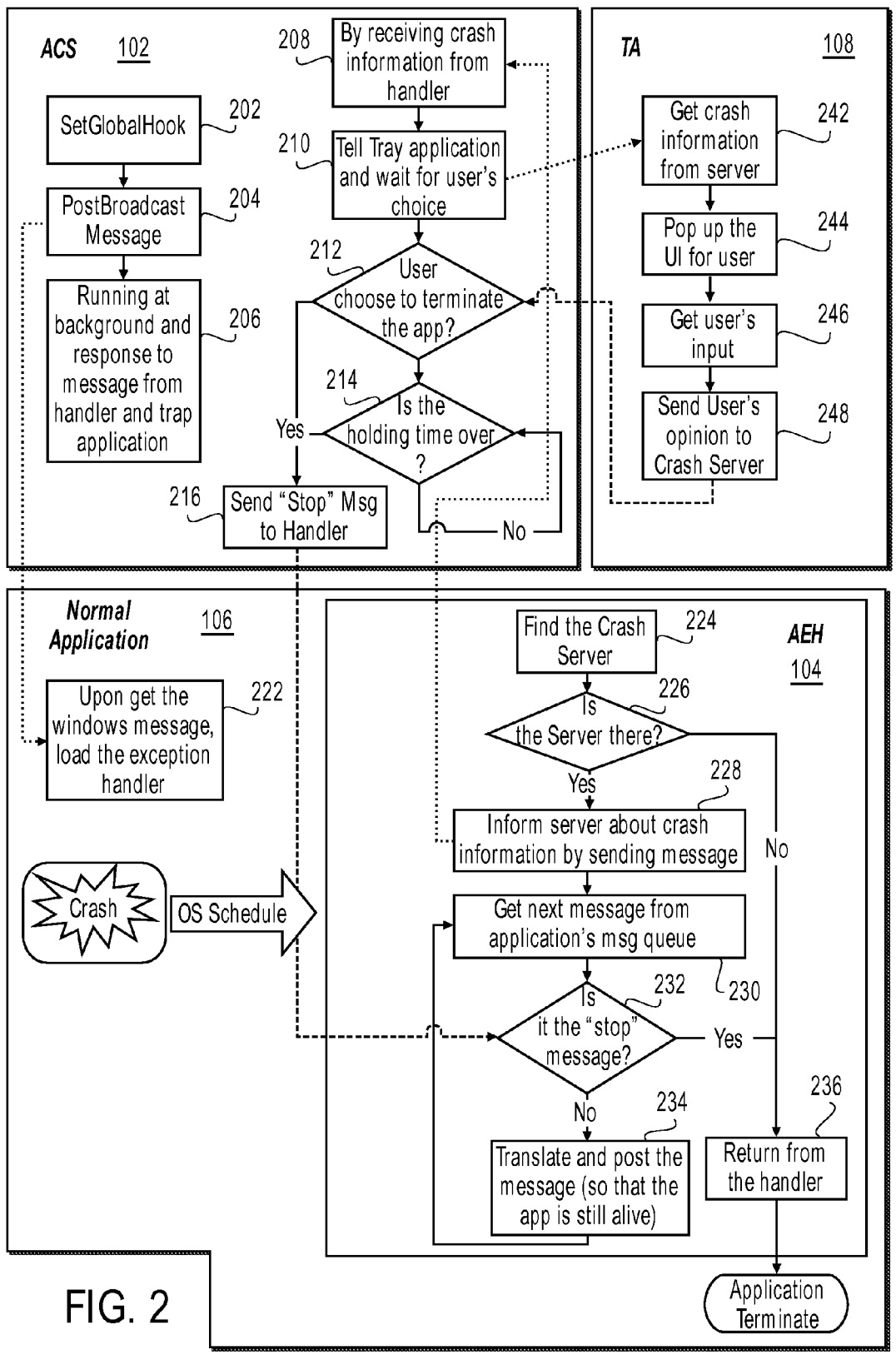
FIG. 2 illustrates a flow chart view of selected operations of selected components of various embodiments of the present invention.

Referring now to FIG. 2, wherein selected operational flows of crash server 102, exception handler 104 and tray application 108, in accordance with various embodiments, are shown. As illustrated in the crash server portion of the Figure, for the embodiments, upon given control after invocation, crash server 102 sets itself up with the underlying operation system so it is able to send and receive messages to and from the various applications executing in the environment (Set Global Hook), block 202. Thereafter, in due course, crash server 102 broadcasts messages to the various executing applications 106a-106c to cause the various applications to correspondingly load instances of exception handler 104a-104c, block 204. The broadcast messages may include location information of the exception handler. After broadcasting the messages, crash server 102 may operate in the background to respond to messages from the various applications 106a-106c, in particular, from their exception handler instances 104a-104c, block 206. While operating in the background, crash server 102 may repeat the broadcasting of the load messages periodically for newly launched applications in the environment.

Referring now to the exception handler portion of the Figure, on receipt of the load message, applications 106a-106c correspondingly install the exception handler instances 104a-104c as requested, block 222. As illustrated, an exception handler instance 104* is given control when the application 106* that loaded the exception handler instance 104* crashes (abnormally terminates). In various embodiments, the control is typically given from an operating system exception handling service, e.g. safe exception handling (SEH) for various Window's operating environments, available from Microsoft of Redmond, Wash. Upon given control, for the embodiments, the exception handler instance locates the crash server 102, blocks 224 and 226.

For the embodiments, if an exception handler instance 104* is not able to locate the crash server 102, the exception handler instance 104* simply allows the application 106* to proceed to crash or terminate abnormally, block 236. However, if it is able to locate the crash server 102, the exception handler instance 104* proceeds to inform the crash server 102 of the crash, block 228. In various embodiments, this may include identification and/or description of the application, as well as description and/or location where the exception occurs.

Upon notifying crash server 102, for the embodiments, the exception handler instance 104* proceeds to get a message from a message queue of the application 106*, block 230. Upon obtaining the message, the exception handler instance 104* determines if it is the "stop" message from the crash server instructing the exception handler instance 104 to stop stalling the abnormal termination and allows the application 106* to proceed to terminate abnormally, block 232. If it is not the "stop" message from the crash server 102, the exception handler instance 104* proceeds to translate the receive message and post the translated message back to the message queue, effectively resisting or stalling the abnormal termination, block 234.

Referring now back to the crash server of the Figure, for the embodiments, upon receipt of the crash (abnormal termination) information, block 208, the crash server 102 proceeds to inform the tray application 108, block 210. Thereafter, it waits for feedback from the tray application 108 on whether the user wants to stall the termination for an amount of time (e.g. to provide time for the user to save his data), or to allow the abnormal termination to proceed, blocks 212 and 214. Upon determining that the user wants to terminate or that the amount of stall time (also refer to as hold time) has elapsed, the crash server 102 proceeds to send a stop stalling message to the exception handler instance 104*, block 216. As described earlier, the exception handler instance 104* responds to the stop message, allowing the application to proceed to abnormally terminate.

Figure 3:
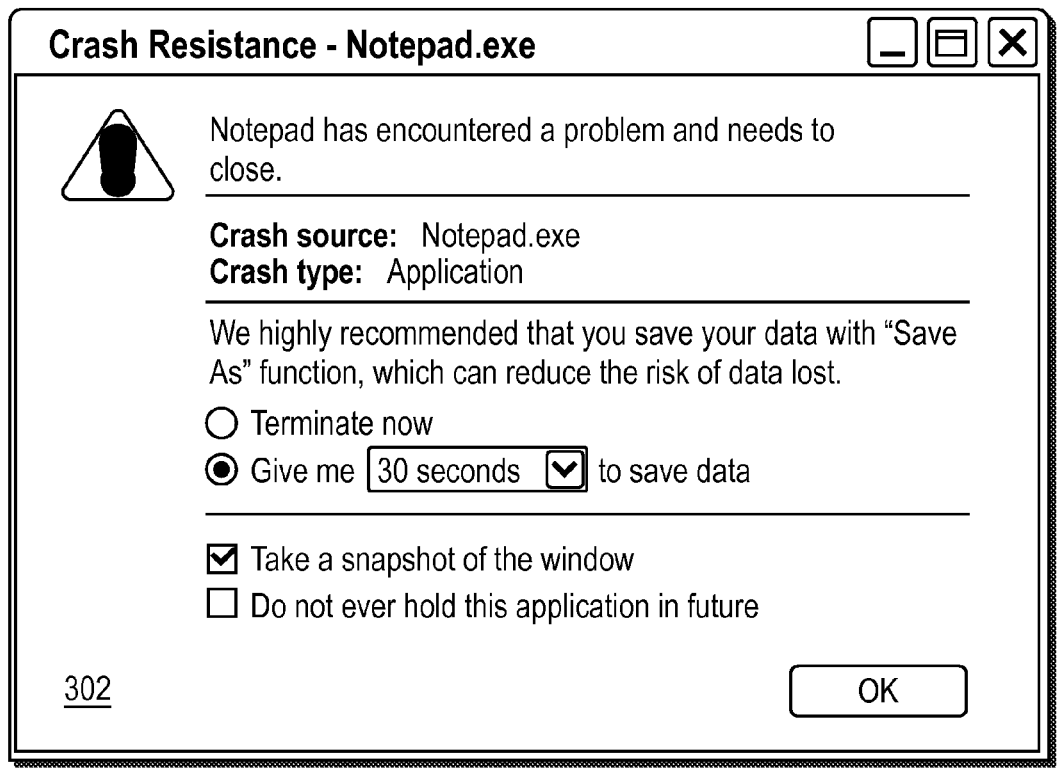
FIGS. 3 and 4 illustrate a couple of example user interface elements, in accordance with various embodiments of the present invention.

Referring now to the tray application portion of the Figure, as illustrated, for the embodiments, upon being contacted by the crash server 102, the tray application obtains the crash information from the crash server 102, block 242. Upon obtaining the crash information, the tray application 108 notifies a user of the crash, block 244, e.g. through a pop up window 302 of FIG. 3. Thereafter, tray application 108 awaits the user's instruction to proceed to terminate abnormally or to hold/stall the abnormal termination for an amount of time, block 246. On receipt of a user's inputs, the tray application 108 relays the user's inputs to crash server 102, which in turn, provides the instructions to the exception handler instance 104*, as described earlier.

Figure 4:
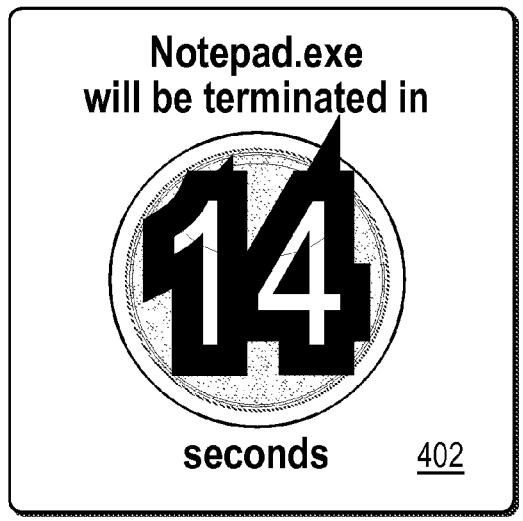
Figure 5:
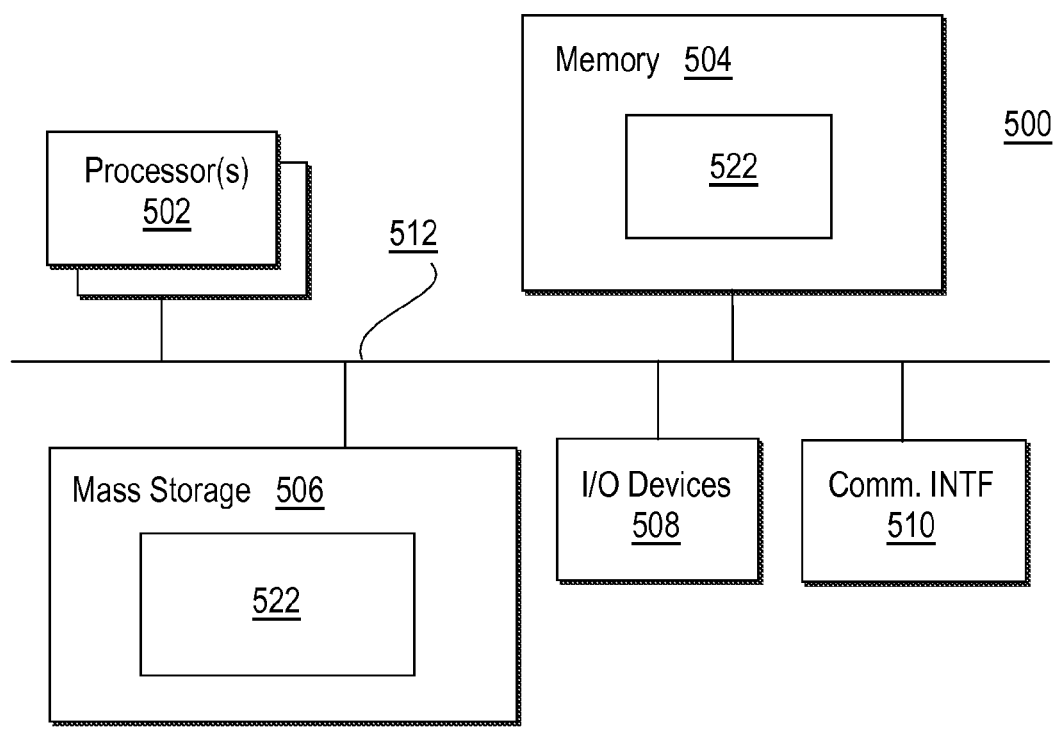
FIG. 5 illustrates an example computer system suitable for use to practice various embodiments of the present invention.

In various embodiments, if the user instructs to stall the abnormal termination for an amount of time, tray application 108 may also provide an user interface element to keep the user informed of the count down towards the abnormal termination, see e.g. FIG. 4. During this period, the user may save his data or take anyone of a number of actions to mitigate the consequence of the application crash. Accordingly, a softer and more user friendly handling of abnormal application termination, such as, e.g., for Microsoft Window application environment, may be achieved FIG. 5 illustrates an example computer system suitable for use to practice various embodiments of the present invention. As shown, computing system 500 includes a number of processors or processor cores 502, and system memory 504. For the purpose of this application, including the claims, the terms "processor" and "processor cores" may be considered synonymous, unless the context clearly requires otherwise. Additionally, computing system 500 includes mass storage devices 506 (such as diskette, hard drive, compact disc read only memory (CDROM) and so forth), input/output devices 508 (such as display, keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing, in whole or in part, the various components, such as crash server 102, exception handler 104* and/or tray application 108, herein collectively denoted as 522. The various components may be implemented by assembler instructions supported by processor(s) 502 or high-level languages, such as C, that can be compiled into such instructions.

The permanent copy of the programming instructions may be, placed into permanent storage 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The constitution of these elements 502-512 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. An article of manufacture comprising:
   a non-transitory tangible computer-readable storage medium; and
   a plurality of programming instructions stored in the storage medium, configured to enable an apparatus, in response to execution of the instructions by the apparatus, to perform operations comprising:
   instantiating a plurality of instances of an exception handler, wherein each of the exception handler instances corresponds to a different one of a plurality of applications executing on the apparatus, wherein each of the exception handler instances is configured to stall an abnormal termination of the corresponding application upon receiving a non-stop stalling message from a message queue of the corresponding application, and to translate the received message and post the translated message back to the message queue of the corresponding application; and
   instantiating an abnormal application termination service configured to enable a user to control the instances of the exception handler in stalling or permitting abnormal terminations of the corresponding applications;
   wherein said instantiating of the plurality of instances of the exception handler is performed responsive to an instruction received from the abnormal application termination service.

2. The article of claim 1, wherein each of the exception handler instances is configured to report an abnormal termination of the corresponding application to the abnormal application termination service.

3. The article of claim 2, wherein the abnormal application termination service is further configured to instruct the reporting exception handler instance to stop stalling the reported abnormal termination of the application upon receiving a stop stalling message from the abnormal application termination service.

4. The article of claim 3, wherein the stop stalling message is generated based at least in part on a user's input.

5. The article of claim 1, wherein the programming instructions are further configured to enable the apparatus to perform operations comprising instantiating a tray application configured to obtain a user's input on behalf of the abnormal application termination service.

6. The article of claim 5, wherein the tray application is further configured to receive a notification of an abnormal application termination from the abnormal application termination service, and to obtain, in response, information about the abnormally terminating application.

7. The article of claim 6, wherein the tray application is further configured to obtain said user's input based on the obtained information about the abnormally terminating application.

8. A method, comprising:
   instantiating, by an apparatus, a plurality of instances of an exception handler, wherein each of the exception handler instances corresponds to an application executing on the apparatus; and
   instantiating, by the apparatus, an abnormal application termination service configured to enable a user to control the exception handler instances in stalling or permitting abnormal terminations of the corresponding applications;
   wherein each of the exception handler instances is configured to perform:
   receiving a message from a message queue of the corresponding application, after the exception handler instance having been given control in response to an abnormal termination of the corresponding application;
   determining whether the received message is a stop stalling message from the abnormal application termination service or an indication of an amount of stall time has expired; and
   if the received message is not a stop stalling message from the abnormal application termination service, translating the received message and posting the translated message back into the message queue to stall the abnormal termination of the corresponding application;
   wherein said instantiating of the plurality of the instances of the exception handler is responsive to an instruction received from the abnormal application termination service.

9. The method of claim 8, wherein each of the exception handler instances is configured to perform repeating said receiving, determining, and translating and posting, to continue to stall the abnormal termination of the corresponding application.

10. The method of claim 9, wherein each of the exception handler instances is further configured to perform reporting the abnormal application termination to the abnormal application termination service, and receiving information about the amount of stall time from the abnormal application termination service.

11. The method of claim 10, wherein each of the exception handler instances is further configured to perform terminating said repeating immediately or in due course, in accordance with the received information about the amount of stall time, to allow the corresponding application to abnormally terminate.

12. The method of claim 10, wherein the abnormal application termination service is configured to perform directly or indirectly providing information about the abnormal application termination to a user and directly or indirectly obtaining an input from the user.

13. The method of claim 10, wherein the abnormal application termination service is further configured to perform broadcasting an exception handler installation message to cause said instantiating of the plurality of instances of the exception handler.

14. An apparatus comprising:
   a non-transitory tangible machine-readable storage medium having stored therein a plurality of programming instructions; and
   a processor coupled to the storage medium, and configured to execute the programming instructions;
   wherein the programming instructions are configured to enable an apparatus, in response to execution of the instructions by the processor, to:
   instantiate a plurality of instances of an exception handler, wherein each of the exception handler instances corresponds to a different one of a plurality of applications executing on the apparatus, wherein each of the exception handler instances is configured to stall an abnormal termination of the corresponding application upon receiving a non-stop stalling message from a message queue of the corresponding application, and to translate the received message and post the translated message back to the message queue of the corresponding application; and instantiating an abnormal application termination service configured to enable a user to control the exception handler instances in stalling or permitting of abnormal terminations of the corresponding applications;

wherein said instantiating of the plurality of instances of the exception handler is performed responsive to an instruction received from the abnormal application termination service.

15. The apparatus of claim 14, wherein the programming instructions are further configured to enable the apparatus to perform instantiating a tray application configured to obtain the user's input on behalf of the abnormal application termination service.

\* \* \* \* \*